S. D. TILLMAN.
Improvement in Apparatus for Showing Latitude, Longitude, and Difference of Time.
No. 129,909. Patented July 30, 1872.
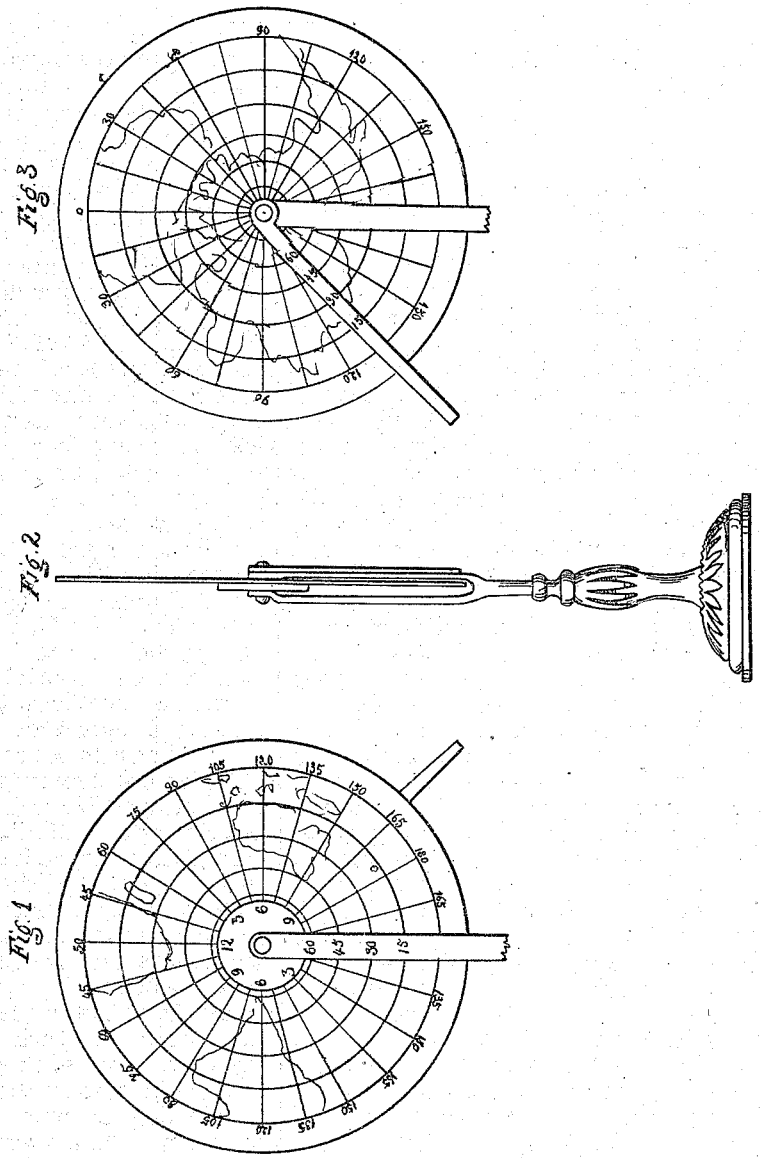

UNITED STATES PATENT OFFICE.

SAMUEL D. TILLMAN, OF JERSEY CITY, NEW JERSEY.

IMPROVEMENT IN APPARATUS FOR SHOWING LATITUDE, LONGITUDE, AND DIFFERENCE OF TIME.

Specification forming part of Letters Patent No. 129,909, dated July 30, 1872.

Be it known that I, SAMUEL D. TILLMAN, of Jersey City, in the State of New Jersey, (formerly of Seneca Falls, Seneca county and State of New York,) have made a new and Improved Apparatus for Ascertaining Latitude, Longitude, and Difference in Time; and I do hereby declare that the following is a full, clear, and exact description of the same, reference being had to the accompanying drawings making part of this specification.

The object of my invention is to construct an apparatus by means of which the position or latitude and longitude of any place on the earth's surface, or of any star in the heavens, also the difference in the time of various places, may be readily determined. My invention consists of a circular map, representing a polar projection of the earth's surface, or of the heavens, combined with two radial arms and a time-disk, all mounted on a common axis, and capable of adjustment in relation to each other about the same.

Figure 1 represents a circular disk, of wood, metal, or pasteboard, on either side of which the hemispheres of the earth are projected upon a plane. The pole of the earth is represented in the center, and the equator by the circular boundary of the plane. This boundary circle is divided into three hundred and sixty degrees, which are properly numbered as degrees of longitude, commencing from any assumed meridian—that of London, for instance. The disk is supported between two stationary arms by means of a pin or axle passing through the center of the disk, and also through the extremities of these arms. These arms are graduated and marked with the degrees of latitude corresponding with the circular lines of latitude which are to be found upon the map. When the latitude and longitude of any place or point on the earth's surface are desired, the disk is turned until such place or point on the map is brought on a line with the graduated stationary arm, and the figures or marks on the arm at that line will give the latitude, and the place where this arm then cuts the graduated outer circle will mark the degree of longitude of such place or point, provided the line of the arm is on a radius of the circle. It will be seen that one side of each of the arms will describe such radius when constructed in the form of the movable arm $m$, and will then give the precise degree of latitude and longitude while the map is in the same position. The movable arm $m$ is attached to the central pivot or axle, and is graduated in the same manner as the stationary arm. When the difference of longitude between two points is instantly required the map is moved until one of the points is on a line with the radial line of the stationary arm, and then the movable arm is turned until its radial line meets the other point; the number of degrees between the intersections of the radial lines of these arms, as measured on the outer circle, will give the difference of longitude. The distance in miles between such points, when in the same latitude, is obtained by multiplying the number of degrees, which is the difference of longitude with the length of a degree of longitude in miles at the latitude of such points. The length of a degree of longitude at every degree of latitude may be marked upon the arms. The circle D represents a dial-plate. Its outer circle is divided into twenty-four equal parts, which are to be counted from one to twelve twice. The object of this graduated plate in connection with the arms is to ascertain the difference of time between any two places shown on the map.

A single stationary arm, $a$, movable arm $m$, and time-disk D are all that are necessary to ascertain the latitude, longitude, and difference of time for one hemisphere, as represented, on one side of the disk; but in practice each of the above-named parts should be duplicated on the other side of the disk, so that the same facts may be ascertained for the other hemisphere. In such case the degrees of longitude on the two maps would be arranged exactly opposite each other, and the stationary arms, being secured together, would have their radial sides in the same plane; so, to ascertain the difference in longitude between places in different hemispheres, it would be simply necessary to bring one of the places to the radial line of a stationary arm, and bring the radial line of the movable arm on the opposite map to the other place, when the difference in longitude could be determined from inspection of the positions of either stationary arm, and of the last-named movable arm. In a like manner the difference of time may be determined by reference to the time-dials, after bringing the same hour on each opposite the radial line of its adjoining stationary arm. In some cases I find it convenient to secure the time-disks D to the stationary arms with the hour "12" opposite the radial side. In such case the difference in time between the places indicated by a stationary and a movable arm is seen by inspection of the position of the latter on the hour-circle D.

When the instrument is to be used as a hand-map, a handle is joined to the stationary arms where they are united outside of the map. When it is made on a larger scale, the part represented as a handle may be united with an ornamental stand of wood, iron, or other substantial material, as represented in Fig. 2.

An arrangement similar to that above described may be used as a celestial atlas by substituting, in place of those described, maps of the stars seen in the northern and southern hemispheres.

It will be readily seen that maps in which great minuteness of representation is required may be made on a larger scale by including within it only a portion of a hemisphere.

It is evident that the map may be held stationary and the so-called stationary arms be made movable with the same results as above described, it being necessary only that the map, as well as the stationary and movable arms, be each capable of adjustment in relation to the other around a common axis.

I am aware that in a globe the latitude may be ascertained by inspection of the divisions on the supporting-circle; also, that the longitude may be determined by moving the globe so as to take the readings on the horizontal graduated circle; but the double arms in my invention, showing at the same time the longitude of both places, and the dial-plate showing also the relative time of the two places, are quite distinctive from any device used in a globe with which I am familiar. I am also aware that protractors with adjustable arms have been used to measure angles, but know of no instance where duplicate arms have been combined with a map and dial-plate.

What I claim as new, and desire to secure by Letters Patent, is as follows, viz.:

In combination with a map, the radial arms $a$ and $m$ and dial-plate D, all mounted on a common axis and capable of adjustment thereon with respect to each other, and arranged and operating substantially as described.

SAMUEL D. TILLMAN.

Witnesses:
   I. H. UNDERHILL,
   E. I. TYLER.